Jan. 4, 1966  A. S. NATANSON  3,226,972
CONSTANT TORQUE MOTOR FOR TESTING GYROSCOPES
Filed April 30, 1963  2 Sheets-Sheet 1

INVENTOR.
Alfred S. Natanson
BY
Morse & Altman
ATTORNEYS

Jan. 4, 1966     A. S. NATANSON     3,226,972

CONSTANT TORQUE MOTOR FOR TESTING GYROSCOPES

Filed April 30, 1963     2 Sheets-Sheet 2

INVENTOR.
Alfred S. Natanson
BY Morse & Altman
ATTORNEYS

3,226,972
CONSTANT TORQUE MOTOR FOR TESTING GYROSCOPES
Alfred S. Natanson, Brookline, Mass., assignor to Wayne-George Corporation, Newton, Mass.
Filed Apr. 30, 1963, Ser. No. 276,836
8 Claims. (Cl. 73—1)

The present invention relates to direct current devices for generating torque and, more particularly, to a direct current motor characterized by a novel D'Arsonval type structure.

It is often desired that a motor drive have minimum inherent torque perturbations. For example, in the case of a turntable for testing gyros, a gyro is mounted on the table in such a way that the table is slaved to any angular rate about the input axis of the gyro (e.g. earth's rotation). Such rates will cause the gyro to produce an electrical output signal which in turn causes power to be applied to the turntable motor. The test procedure requires that the gyro test turntable follow only the commands of the gyro and not respond to extraneous torques resulting from frictional, magnetic and other effects normally encountered. Prior D'Arsonval type devices provide perturbation free torque but operate only throughout a limited angle. The present invention provides a D'Arsonval type torquer, capable of rotation throughout 360°, which is characterized by absence of magnetic hysteresis drag torque commonly encountered in direct current motors, absence of ripple torque commonly resulting from electrical and mechanical commutation transients, absence of slot ripple effects commonly associated with direct and alternating current motors, and freedom from the coulomb friction and friction variation commonly resulting from commutator brushes.

A D'Arsonval torquer generally comprises a magnet and a coil that generate torque relative to each other when a direct current is passed through the latter. With proper design an extremely uniform field throughout a substantial relative angle between the component may be produced. The primary object of the present invention is to take advantage of the foregoing characteristic of a D'Arsonval type structure by mounting both the magnet and the coil in such a way that, while movable relatively with respect to each other, they are movable together also as a unit, this unit being in combination with a transducer for generating a signal representing the instantaneous angle of the coil and a servo for driving the magnet in response to this signal. The arrangement is such that the servo maintains the magnet at an approximately predetermined relative orientation with respect to the coil and the current in the coil determines the torque independently of minor variations in this relative orientation. Because the field between the magnet and the coil is designed to be uniform throughout a considerable relative angle therebetween, it follows that the torque generated by direct current in the coil is independent of perturbations in the servo.

Specific objects of the present invention are: to electrically connect components associated with the coil with components associated with the magnet through flex leads, which do not appreciably contribute to the torque relationships in the system; to provide a particular sensor for converting angular position of the coil into an electrical signal; and to provide a D'Arsonval type direct current motor of the foregoing type in conjunction with a gyro test table.

Other objects of the present invention will in part be obvious and will in part appear hereinafter.

The invention accordingly comprises the apparatus possessing the features, properties, and relations of components that are exemplified in the following disclosure, the scope of which will be indicated in the appended claims.

For a fuller understanding of the nature and objects of the present invention, reference should be had to the following detailed description taken in connection with the accompanying drawings, wherein.

Figure 1:
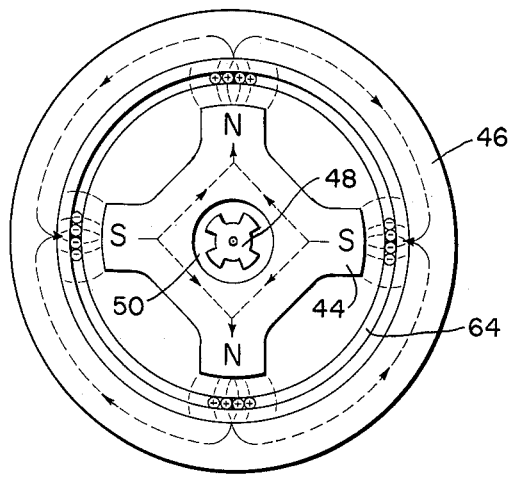
FIG. 1 is a diagrammatic, broken-away top plan view of a device embodying the present invention.

With reference now to the drawings, the illustrated device generally comprises a turntable 20 that is rotatable on a shaft 22 about an axis 24 and pivotable, as at 26, about an axis that is perpendicular to axis 24. Also mounted for rotation about axis 24 are a driving assemblage 28 and a driven assemblage 30, both to be described below in detail. Driven assemblage 30, which is mechanically connected by shaft 32 to turntable platform 34, is journaled for rotation at bearings 36 and 38. Driving assemblage 28, which is independently movable with respect to driven assemblage 30, is journaled at bearings 40 and 42.

Driven assemblage 30, the component parts of which are indicated as being fixed with respect to each other by dashed lines, includes a four-pole alternately north and south permanent magnetic rotor 44, of the D'Arsonval type, an annulus 46 serving as a flux return path, and the rotor 48 of a transducer 50, the specific function of which is described below in detail. The outer peripheries of the poles of rotor 44 are circular arcs about radius 24. D'Arsonval rotor 44 and annulus 46 are seated within and affixed to an inverted disk mount 52. Disk mount 52 is provided with a circular groove 54 that is in alignment with the annular space between rotor 44 and annulus 46. Transducer rotor 48 is affixed to D'Arsonval rotor 44 by shaft 32.

Figure 1A:
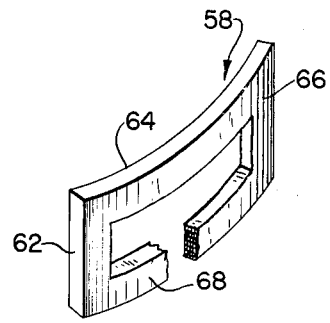
FIG. 1A is a partly broken-away, perspective view of a component of the device of FIG. 1.

Driving assemblage 28, the component parts of which are indicated as being fixed with respect to each other by dashed lines, includes a stator 56 (with respect to driving assemblage 28) in the form of a disk that is parallel to D'Arsonval rotor 44, four coils 58 of the D'Arsonval type that are mounted on stator 56, and a stator 60 that is part of transducer 50. Each coil 58 is convoluted about an axis that is disposed midway between two of the adjacent poles of D'Arsonval rotor 44. Each coil 58, as is shown in FIG. 1a, is arcuately shaped for movement within correspondingly shaped groove 54. Each coil includes four portions 62, 64, 66 and 68. Portions 62 and 66 are straight legs and portions 64 and 68 are arcuate bows connecting legs 62 and 66. Coils 58 contiguously abut each other edge-to-edge at the center of the pole of D'Arsonval rotor 44 to which they are adjacent.

Figure 2:
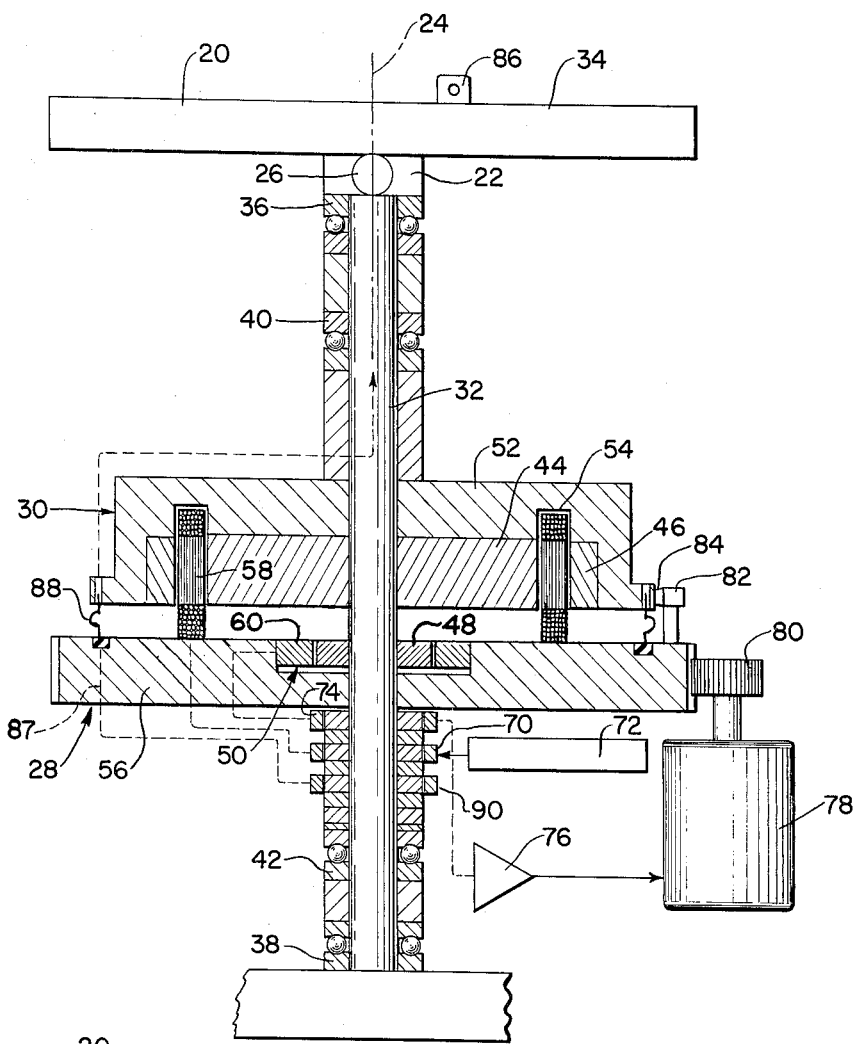
FIG. 2 is a vertical axial cross-sectional view of the device of FIG. 1, in association with auxiliary components.
Figure 2A:
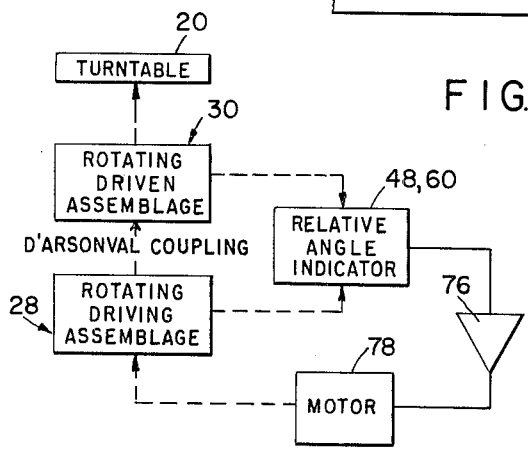
FIG. 2A is a block diagram, illustrating the interaction of components, of the device of FIG. 1.

Direct current is fed to coils 58 through a suitable slip ring and follower arrangement 70 from a direct current supply 72. Transducer 50 is energized and transmits an output signal through a suitable slip ring and follower arrangement 74. This output signal is applied through a servo amplifier 76 to a suitably energized direct motor 78, which causes rotation of driving assemblage 28 through suitable gearing 80. A stop 82 is affixed to stator 56 and a lug 84 affixed to disk mount 52 limit relative rotation of driven assemblage 30 and driving assemblage 28. In addition to suitable fasteners for securing a gyro to the top of table 34, there are a series of electrical terminals 86 which are electrically connected as shown in dashed lines at 87 through flex leads 88 (are shown) between driven assemblage 30 and driving assemblage 28 to slip ring and follower arrangement 90 for the transfer of power and information. The dashed lines designated by 87 are not shown as full lines for the purpose of illustrative clarity. Flex leads 88 are sufficiently fragile to avoid introducing any appreciable undesired torque into the system. Direct current supply 72, servo amplifier 76 and motor 78 all are of conventional design, as shown in FIG. 2a.

Figure 3:
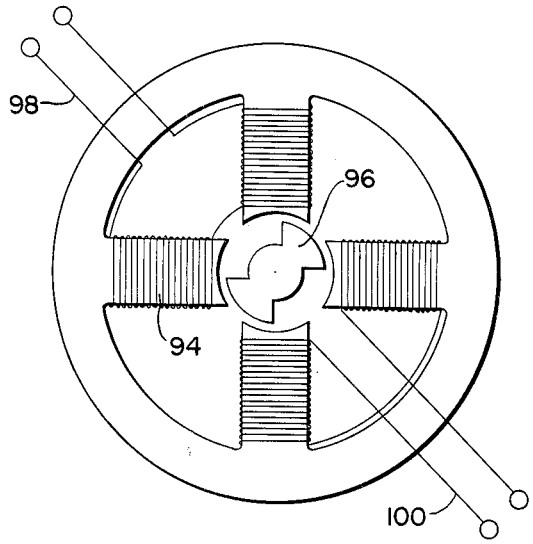
FIG. 3 is a diagrammatic, broken-away, top plan view of a component of the device of FIGS. 1 and 2.

Transducer 50, as shown in FIG. 3, includes annular stator 60, which has four inwardly directed poles 94, and rotor 48, which has two oppositely directed poles. One winding 98 is coiled sequentially about poles 94 for the purpose of excitation. A second winding 100 is coiled sequentially about poles 94 for the purpose of generating an output signal. This output signal depends upon the angular position of rotor 48. Although the foregoing connections are not shown in FIGS. 1 and 2, it will be understood that all are made through slip ring and follower arrangement 74. Although transducer 50 is illustrated as being what is known in the art as a microsyn, more generally, transducer 50 is simply an electromagnetic transducer the function of which is to produce an electrical signal proportional to angular displacement.

The operations of the system illustrated herein is as follows. Direct current power is supplied to coils 58 on driving assemblage 28 through slip ring and follower arrangement 70 to produce torque on driven assemblage 30. The reaction torque is balanced by torque applied by direct current motor 78 acting through gear train 80. This balancing torque is obtained as follows. As motion proceeds, the signal from position transducer 50 is directed through servo amplifier 76 which controls power to direct current motor 78. This causes driving assemblage 28 not only to supply balancing torque but to follow driven assemblage 30. Coils 58 on driving assemblage 28 thereby remain in their respective fields at all times. Perturbations in this servo loop have negligible effect on the torque applied to the driven assemblage 30 for the reason that by judicious design, the uniform magnetic field effectively overlaps coils 58 of the D'Arsonval rotor.

The described system constitutes a novel application of a D'Arsonval type arrangement in a direct current motor capable of continuous rotation and characterized by ripple free torque. When this system is applied to a gyro test turntable containing a frictionless bearing support, e.g. having hydrostatic air bearings of the type disclosed in patent application Serial No. 160,517, filed Dec. 19, 1961 for Test Turntable for Inertial Guidance Devices in the names of Goddard C. Parsons and Robert D. Roy (which application is incorporated herein by reference), a totally frictionless system having no extraneous torque perturbations due to magnetic or coulomb effects is produced. It will be understood that this direct current motor is applicable to many other devices requiring a ripple free torque unhampered by attendent frictional effects.

Since certain changes may be made in the above device without departing from the scope of the invention herein involved, it is intended that all matter described in the foregoing specification and illustrated in the accompanying drawings shall be interpreted in an illustrative and not in a limiting sense.

What is claimed is:

1. A torque generating device comprising a base, driving means rotatable on said base about an axis, driven means rotatable on said base about said axis, said driving means and said driven means being relatively movable with respect to each other, a D'Arsonval type unit including a first member and a second member relatively movable, said first member being affixed to said driven means, said second member being affixed to said driving means, drive means for causing rotation of said driving means, sense means for generating a signal representing the angularity of said driven means with respect to said driving means, and servo means for applying said signal to said drive means in order to control the speed of said drive means.

2. The device of claim 1 wherein said driven means and said driving means are connected electrically by flex lead means.

3. The device of claim 2 wherein said first member, said flex leads and said second member are electrically connected to auxiliary equipment by slip ring means.

4. The device of claim 1 wherein said first member and said second member include a multipole magnet structure and a multi-coil conductor structure, said magnet structure and said conductor structure being rotatable with respect to each other throughout a limited restricted angle.

5. A torque generating device comprising a base, a driving assemblage rotatable on said base about an axis, a driven assemblage rotatable on said base about said axis, said driving assemblage and said driven assemblage being relatively movable with respect to each other, said driven assemblage including a rotor affixed thereto for rotation about said given axis, said driving assemblage including coils affixed thereto for rotation about said given axis, a slip ring arrangement for introducing direct current to said coils, a motor for causing rotation of said driving assemblage, an angle transducer for generating a signal representing the angular position of said driven assemblage with respect to said driving assemblage, and an amplifier for applying said signal to said motor in order to control the speed thereof, said driven assemblage and said driving assemblage being connected electrically by flex leads, said coils being contiguously arranged in an arc.

6. The torque generating device of claim 5 wherein a flux return annulus is carried on said driven assemblage, a gap being provided between said rotor and said annulus, said coils being located in said gap.

7. A torque generating device comprising a base a driving assemblage rotatable on said base about an axis, a driven assemblage rotatable about said base about said axis, said driving assemblage and said driven assemblage being relatively movable with respect to each other, said driving assemblage including coils contiguous with said rotor, said driven assemblage including a magnetic rotor affixed thereto for rotation about said given axis, a slip ring arrangement for introducing direct current to said coils, a motor for causing rotation of said driving assemblage, an angle transducer for generating a signal representing the angular position of said driven assemblage with respect to said driving assemblage, an amplifier for applying said signal to said motor in order to control the speed thereof, an electrical inlet on said driving assemblage and an electrical outlet on said driven assemblage, a flex lead connecting said inlet to said outlet, said coils being contiguously arranged end-to-end in an arc, a flux return annulus in said driven assemblage, an annular gap between said rotor and said annulus, said coils being located in said annular gap, each of said coils having a pair of straight legs and a pair of arcuate bows connecting the extremities of said straight legs, and a direct current supply for said coils, said rotor having a sequence of poles, said straight legs of each coil being spaced from each other substantially the same distance as said poles are spaced from each other, said driving assemblage being driven by said motor as a function of angularity between said driving assemblage and said driven assemblage, said driven assemblage being driven by the interaction of said coils and said rotor, whereby torque perturbations in said driven assemblage are minimized.

8. A torque generating device comprising a base, a driving assemblage rotatable on said base about an axis, a driven assemblage rotatable on said base about said axis, said driving assemblage and said driven assemblage being relatively movable with respect to each other, said driven member including a magnetic rotor affixed thereto for rotation about said axis, said driving assemblage including coils contiguous with said rotor, a slip ring arrangement for introducing direct current to said coils, a motor causing rotation of said driving assemblage, an angle transducer for generating a signal representing the angular position of said driven assemblage with respect to said driving assemblage, an amplifier for applying said signal to said motor in order to control the speed thereof, an electrical inlet on said driving assemblage and an electrical outlet on said driven assemblage, a flex lead connecting said inlet to said outlet, said coils being contiguously arranged end to end in an arc, a flux return annulus in said driven assemblage, an annular gap between said rotor and said annulus, said coils being located in said annular gap, each of said coils having a pair of straight legs and a pair of arcuate bows connecting the extremities of said straight legs, and a direct current supply for said coils, said rotor having a sequence of poles, said straight legs of each coil being spaced from each other substantially the same distance as said poles are spaced from each other, said driving assemblage being driven by said motor as a function of angularity between said driving assemblage and said driven assemblage, said driven assemblage being driven by interaction of said coils and said rotor, a shaft along said axis journalled on said base, said driven assemblage being keyed to said shaft, said angle transducer having an inner member and an outer member, said inner member being affixed to said shaft and having two oppositely directed poles, said outer member being movable with said driving assemblage and having four inwardly directed poles equally spaced from each other, a winding for two adjacent ones of said four inwardly directed poles, a winding for the two others of said four inwardly directed poles, said signal representing said angular position of said driven assemblage with respect to said driving assemblage appearing on said windings, gear teeth on said driving assemblage, an output gear for said motor, said output gear meshing with said gear teeth, first stop means on said driving assemblage, second stop means on said driven assemblage, said first stop means and said second stop means operating to limit the maximum rotation of said driven assemblage with respect to said driving assemblage, supports for a gyro or the like to be tested affixed to an extremity of said shaft, whereby torque perturbations in said driven member and in said support are minimized.

References Cited by the Examiner
UNITED STATES PATENTS 1,798,592  3/1931  Davis _____ 33—204.66
2,590,428  3/1952  Noxon _____ 33—222.7

LOUIS R. PRINCE, *Primary Examiner.*

O. L. RADER, *Examiner.*